Figure 1:
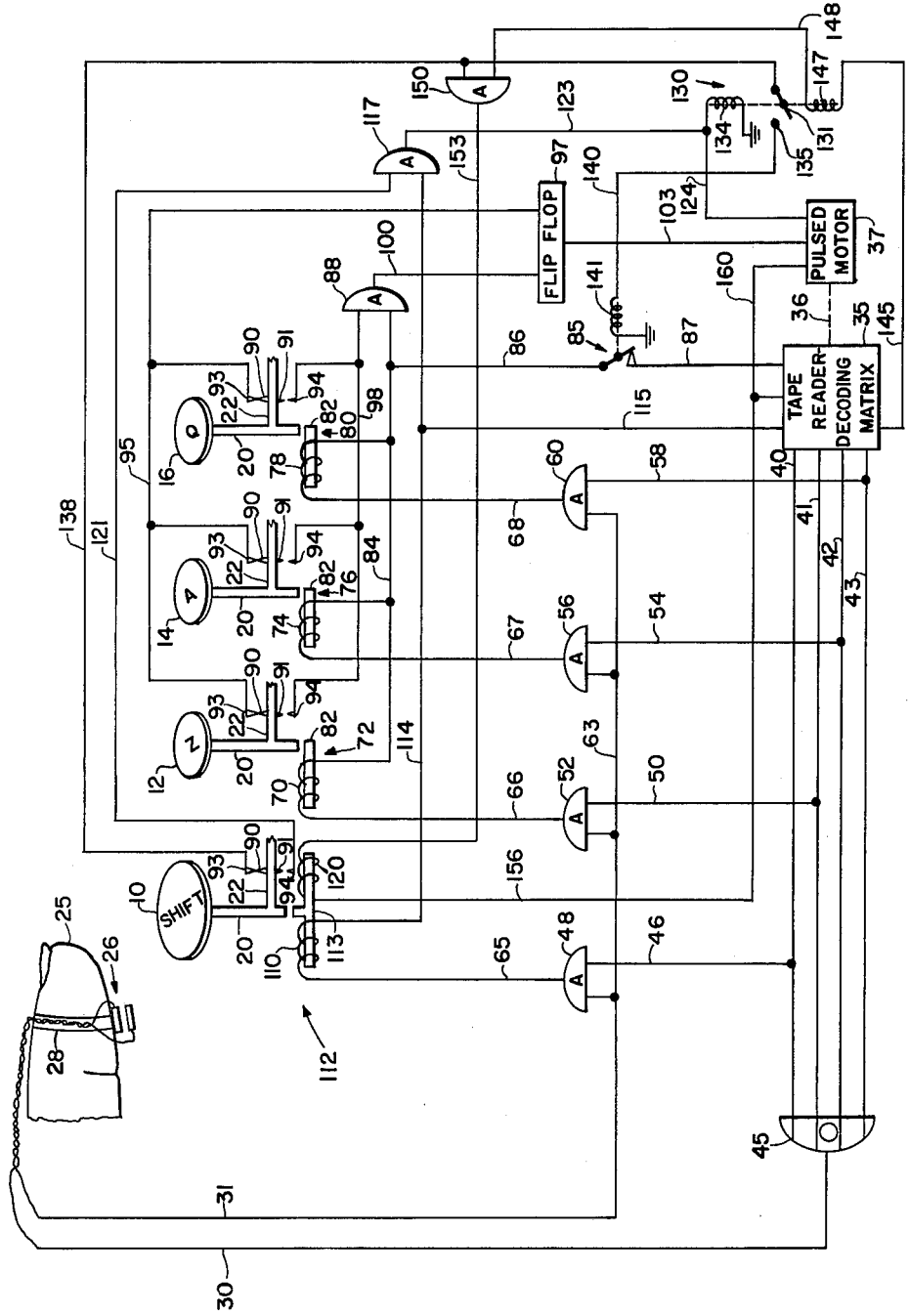

Feb. 15, 1966 B. W. YAEGER 3,234,664
TRAINING APPARATUS
Filed Sept. 5, 1963 2 Sheets-Sheet 1

FIG. I

INVENTOR.
BERNARD W. YAEGER
BY Charles J. Ungemach
ATTORNEY

INVENTOR.
BERNARD W. YAEGER
BY Charles J. Ungemach

United States Patent Office 3,234,664
Patented Feb. 15, 1966

3,234,664
TRAINING APPARATUS
Bernard W. Yaeger, Glendora, Calif., assignor to
Honeywell Inc., a corporation of Delaware
Filed Sept. 5, 1963, Ser. No. 306,740
8 Claims. (Cl. 35—5)

This invention relates to apparatus for training students in the operation of devices requiring manual manipulation, and more particularly, to devices which have a plurality of members, each of which should normally be actuated in a predetermined or a determinable sequence.

A large number of present day machines and devices require manipulation by an operator in a predetermined way, and frequently, instructing the operator in the use of these devices requires long hours of instruction. For example, a typewriter or a punched card keypunch device has a plurality of keys which must be actuated by the operator with certain fingers and according to a sequence depending upon the matter to be typed or to be punched. Other devices have similar actuable members which must be operated in a predetermined manner by the student, and while the invention herein disclosed has broad usage with a number of types of machines, it will be specifically described in connection with a typewriter as the preferred embodiment of the invention.

In training a student to use a typewriter, a number of problems are encountered. Each finger of the operator's hand is supposed to operate more than one key, except, of course, the thumbs, which operate the space bar. Likewise, each of the keys is normally supposed to be actuated by a particular finger of the operator's hand, and in some cases, two members must be actuated simultaneously; as for example, for upper case, the shift key and another key. Students normally take extensive training courses to learn to type, which are time consuming and expensive. Furthermore, in the process of learning to type with the normal class room instruction, the student frequently makes errors: these errors are not immediately corrected, but sometimes are only noticed after the instructor has checked the paper which is typed. Thus, the student is allowed to make the errors and considerable time elapses before the existence of the error is brought to his attention. By allowing a student to make errors without immediate correction, undesirable patterns of operation or movements are learned, and it is found that the student is more likely to repeat that error than if it were immediately corrected or prevented. The very act of making an unnoticed error causes the student to partially learn the improper movement resulting in the error. This partially learned improper movement must then be unlearned, or said differently, the student must learn to inhibit the improper movement to learn the correct movement.

It is therefore an object of the present invention to provide a machine upon which a student may learn to type correctly by permitting only correct movements, and which requires considerably less class room instruction. It is a further object of the present invention to provide a machine which prevents the student from completing erroneous movements, and forces him to type correctly so that undesirable responses are not initially learned.

Briefly, the invention comprises apparatus for use with a typewriter, or other hand manipulated machines, which utilize a plurality of holding devices normally operable to prevent actuation of any of the keys or members. A tape reader or other predetermined sequencing device produces a signal in accordance with a predetermined sequence of operation of the machine, which causes release of that holding device corresponding to the member to be actuated. Thus, if a student is to type the letter "a," a sequencing device will produce a signal which is used to release the holding device connected to the letter "a" key and to allow its actuation. To assure that the operator strikes the letter "a" with the little finger of the left hand, I provide a plurality of switches, one each of which is connected to each of the operator's fingers. These switches will be connected between the sequencing device and the holding device in series, so that only upon pressing the letter "a" with the little finger of the left hand may that key be depressed. If an attempt is made to strike the letter "a" with a different finger, the circuit to the holding device is not complete, and the letter "a" will remain in its locked position thus preventing a mistake from being made. Likewise, if the letter "q" is accidentally struck rather than the letter "a," the circuit to the "q" holding device will not be complete and the machine will prevent the letter from being struck.

Figure 2:
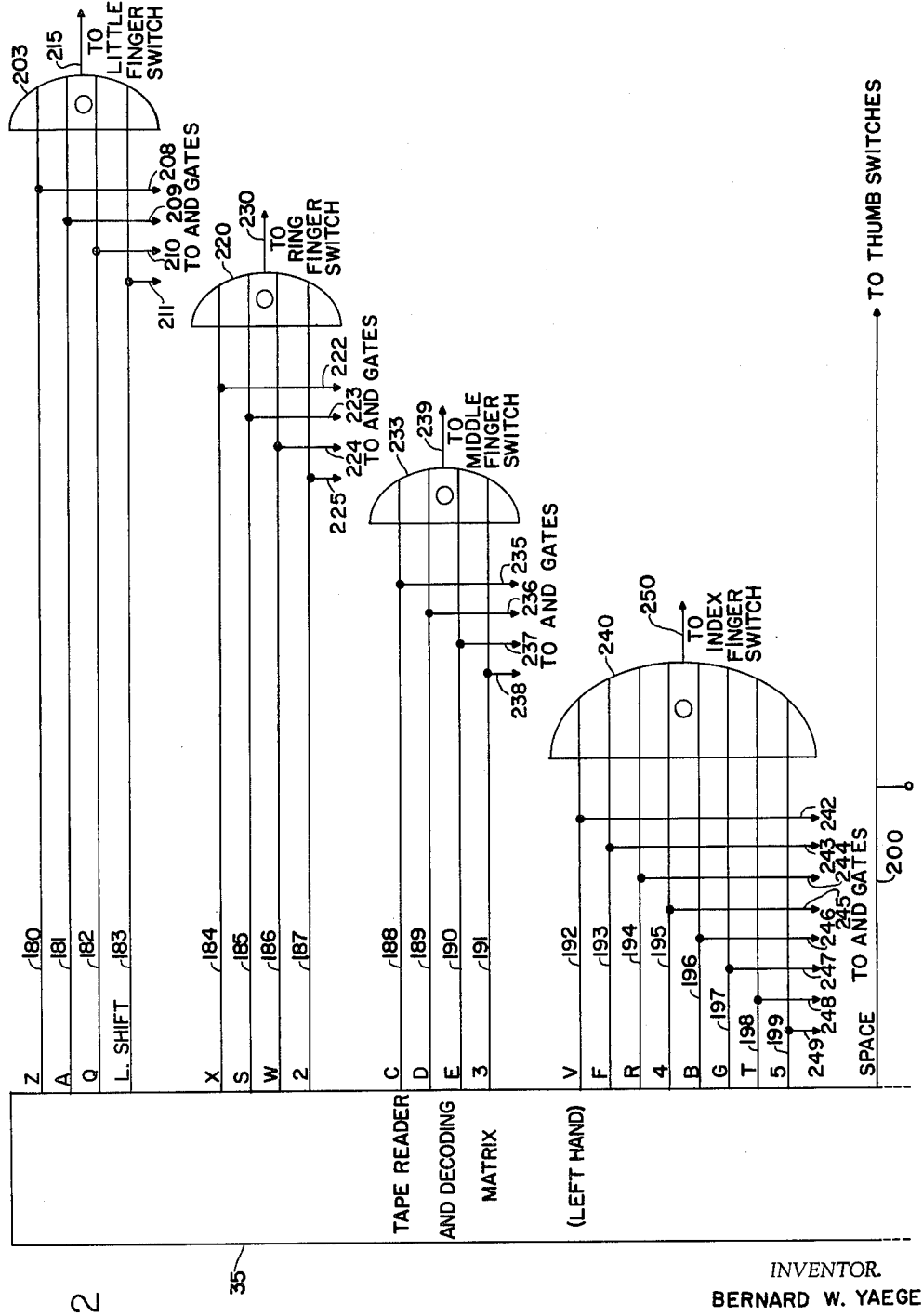

A more complete understanding of the present invention will be gained upon a reading of the following specification and claims when taken in connection with the drawings in which:

FIGURE 1 is a schematic representation of a portion of the circuit of one embodiment of the present invention; and FIGURE 2 is a logic diagram showing signals to be presented to the fingers of the left hand and their corresponding keys.

Referring to FIGURE 1, the keys to be actuated by the left little finger are shown as shift key 10, the letter "z" key 12, the letter "a" key 14, and the letter "q" key 16. The shift lock key has not been shown, since it normally operates in conjunction with the shift key 10, and serves no function but to hold the shift key down for longer periods of time. Each of the keys is shown having an actuating lever 20 attached thereto, which includes a lateral extension 22 leading to the typewriter mechanism, not shown, to actuate the typing mechanisms. The actuating levers 20 may take various forms, depending upon the typewriter or other machine used, and their exact shape is of little consequence.

Also shown in FIGURE 1 is the representation of the left little finger of the student 25, upon which is mounted a two pole switch 26, which is normally biased to an open position such as with a spring. The two pole switch may be made very small so that it is practically unnoticed by or not bothersome to the student in his typing and may be attached to the student's finger in any practical way, for example, as shown in the drawing by a strap 28. The switch 26 is connected into the circuit of FIGURE 1 by means of two wires 30 and 31, which may lead down the back of the student's hand and may be attached to other portions of the student's fingers, hand, and arms, by means not shown. The switch 26 is biased to an open position very lightly so that slight pressure upon any of the keys by the finger 25 will cause the switch to close to complete a circuit which will be described.

Also shown in FIGURE 1 is a box labeled "Tape Reader-Decoding Matrix" 35 shown connected by mechanical dashed connection 36 to a pulsed motor box 37. The tape reader 35 may be any standard commercially available tape reader, and in the preferred embodiment, comprises a six channel punched tape reader. The tape reader will normally provide output signals on six parallel lines indicative of the bindary code punched on the tape. The signals are presented to flip-flops or relays to provide "zero" and "one" signals for a decoding matrix. The decoding matrix may be standard diode decoding matrix, will know in the art, having a plurality of outputs upon which signals appear depending upon the binary code from the tape reader. The pulsed motor 37 may be any standard step-type motor, which operates on a change of input signals to step the tape reader one position so that the next code may be read. The pulsed motor, tape reader, and decoding matrix are all known in the art and from no part of the present invention. The tape reader will have as an input a punched tape upon which a binary code has been placed representing the text material which the student is to type, and the pulsed motor 37 will step this punched tape in response to the correct actuation of a key so that the output of the tape reader will be a signal on one of its plurality of output terminals, which signal is indicative of the next letter to be typed. In this manner the tape reader is stepped from position to position as a correct letter is typed and always produces an output indicative of the next letter to be typed.

Although the tape reader has a number of outputs substantially equal to the number of keys to be depressed by the student, for purpose of simplicity, only the four outputs indicative of keys to be pressed by the little finger of the left hand have been shown in FIGURE 1. These four outputs are identified with reference numerals 40, 41, 42, and 43. An output signal on line 40 is the call for a shifte down operation by the student, while an output on line 41 is the call for the actuation of the "z" key, an output on line 42 is the call for an actuation of the "a" key, and an output on line 43 is the call for actuation of the "q" key. Other outputs from the tape reader would lead to other fingers of the student's hand, and to other keys, not shown in FIGURE 1.

Line 40, 41, 42, and 43 in FIGURE 1 are shown connected to an OR gate 45, which has as an output the line 30 leading to one side of the switch 26 on the operator's left little finger 25. A signal on any of the lines 40–43 will produce a signal on line 30, since an OR gate allows any signal at its input to be presented at its output. When the student presses finger 25 against any key, switch 26 will close and the signal on line 30 will appear on line 31.

Line 40 is also shown connected by the conductor 46 to one input of an AND gate 48. Line 41 is shown connected by a conductor 50 to one input of AND gate 52. Line 42 is shown connected by a conductor 54 to one input of an AND gate 56, and line 43 is shown connected by a conductor 58 to one input of an AND gate 60. AND gates 48, 52, 56, and 60 each have an additional input which are connected together to a conductor 63, which in turn is connected to the conductor 31 leading to one side of the switch 26 on the operator's finger 25. It is seen that when switch 26 is closed, the signal from the OR gate 45, traveling through the switch 26 onto line 31, will be presented to one input of each of the four AND gates 48, 52, 56, and 60 shown in FIGURE 1. However, since a signal only appears on one of the lines 40–43, only one of the AND gates 48–60 will have an input on its other terminal.

AND gates 48–60 operate to produce an output signal on lines 65, 66, 67, and 68 respectively, provided there is simultaneous occurrence of input signals at both of its inputs. It is thus seen that only one of the AND gates may produce an output signal at any one time. For example, assume that there was a signal on line 41 from the tape reader 35. This signal would progress to one input terminal of AND gate 52 by means of conductor 50, and would appear through OR gate 45 and switch 26 to the other input by means of conductor 63 when the student depresses a key.

Output line 66 of AND gate 52 is connected to a coil 70 of a solenoid 72. A signal on the output line 67 of AND gate 56 is presented to a coil 74 of a solenoid 76, and a signal on output line 68 of AND gate 60 is presented to a coil 78 of a solenoid 80. Solenoids 72, 76, and 80 are mounted adjacent to the actuating levers 20 of keys 12, 14, and 16 respectively, and in their unenergized position, prevent the actuation of these keys by means of a solenoid member 82 associated with each solenoid. When one of the coils of a solenoid is energized, member 82 of that solenoid will move to the left, thereby allowing its associated key to be depressed. The other sides of coils 70–78 are connected to a conductor 84, which is in turn connected to normally closed solenoid operated switch 85 by means of a conductor 86, and from there, by a conductor 87 to the tape reader 55 to complete the circuit for the coils. Conductor 84 is also connected to one input terminal of an AND gate 88.

The lateral extensions 22 of the actuating levers 20 for each of the keys, has connected thereto a pair of switch contacts 90 and 91. These switch contacts are energized by a source of voltage, not shown, and cooperate with adjacent switch contacts 93 and 94. Contacts 90 are shown in their normal raised position in contact with contacts 93 so that an electric signal from the source of voltage not shown, through contacts 90 and 93 is presented to a conductor 95 which leads to one input terminal of a flip-flop circuit 97. When any of the keys 10–16 are depressed, contacts 90 and 93 separate for that key, and contacts 91 and 94 close to present a signal from the source of voltage, not shown, through the contacts 91 and 94 to a conductor 98, which leads to the other input terminal of the AND gate 88. The output of AND gate 88 is presented by conductor 100 to the other input terminal of the flip-flop 97. The output of flip-flop 97 is presented by conductor 103 to an input of the pulsed motor 37. It is thus seen that when AND gate 88 has simultaneous input signals on its two inputs, it will produce an output on conductor 100 and if the flip-flop 97 is in the correct state, will product an output on conductor 103 to cause the pulse motor 37 to step the tape reader 35 to the next coded position.

Simultaneous inputs on the two input terminals of AND gate 88 can only occur when the correct letter has been properly actuated by the correct finger of the student's hand. This can be shown as follows. Again, assuming that a signal is presented from the tape reader 35 on the conductor 41 calling for the student to type the letter "z." This signal will be presented by means of conductor 50 to one terminal of AND gate 52. The same signal will also be presented through the OR gate 45 to the conductor 30, and when the student operates a key to close switch 26 it will appear on conductor 31 so that a signal is presented to the other AND gate input of all AND gates 48–60. However, since only AND gate 52 has its first input terminal energized, only AND gate 52 will product an output signal. This output signal is presented by conductor 66 to the solenoid coil 70, and then by conductor 84 to the first input terminal of AND gate 88. If the student tries to actuate any key but the "z" key, he will find that key is locked and cannot be depressed. If, however, he strikes the "z" key, since the solenoid coil 70 has pulled the member 82 to the left, the "z" key may be actuated. Depressing the "z" key causes a signal to be presented from the source of voltage, not shown, through the contacts 91 and 94 to the conductor 98 leading to the other input terminal of AND gate 88. AND gate 88 now having both of its input terminals energized will produce a signal on conductor 100, which will pass through flip-flop 97 to conductor 103 and cause pulse motor 37 to step the tape reader to the next position.

The purpose of flip-flop 97 is to prevent the student, after he has once actuated the proper key, from holding it down while he actuates another letter. Once an output from AND gate 88 has gone through the flip-flop 97 to actuate pulse motor 37, no further output from AND gate 88 can so operate until flip-flop 97 is reset. The resetting of flip-flop 97 is obtained when the student releases the key which has just been typed. For example, upon release of the key, which was just typed, a signal from the source of voltage, not shown, through the switch contacts 90 and 93 will be presented by conductor 95 to the other input terminal of the flip-flop 97. This signal resets the flip-flop so that the next time the student actuates the correct key, the output of AND gate 88 will cause pulse motor 37 to step to the next position.

It can thus be seen that the student is forced to type the text material exactly as it has been set up on the coded tape for the tape reader, and that he must actuate the proper key with the correct finger, otherwise, the machine will lock. Thus, the student is forced to type correctly, and immediately becomes aware of any errors or erroneous strokes which can not be completed without the necessity of having an instructor check the typewritten material. Furthermore, with the apparatus of this invention, a mock-up type typewriter may be used consisting only of a special keyboard with the rest of the apparatus including the paper for typing, all the levers and other mechanisms eliminated. This is true since the student knows he is typing correctly as he progresses, and the necessity for checking the typed material is eliminated.

The operation of the shift key 10 presents a special problem, since the shift key must be depressed and must remain depressed while another key is actuated to obtain a capital letter. As shown in FIGURE 1, the output of AND gate 48 on conductor 65 is fed to a coil 110 of a double acting solenoid 112 having a movable member 113. The other side of coil 110 is connected by conductor 114 and a conductor 115 back to the tape reader 35 to complete the circuit. Conductor 114 is also connected to one input terminal of an AND gate 117.

Solenoid 112 is of the type that when it is actuated into one position, it will remain in that position until it is pulled into the initial position by either a separate coil, or by reversal of the current through the first coil. As shown in FIGURE 1, a second coil 120 is provided for the solenoid 112, which when energized, will pull the member 113 back to its initial position. Coil 110 actuates member 113 to the left so as to allow operation of the shift key 10 when it is called for. If a signal appears on line 40 from tape reader 35, this signal will be presented by conductor 46 to one input terminal of the AND gate 48 and will also be presented through the OR gate 45 to conductor 30, and when the student presses a key, will be presented through the switch 26 to the conductor 31 and thence to the other input of the AND gate 48. If the student presses the shift key 10, as is required, a current will flow through the coil 110 pulling the member 113 to the left to allow the actuation of the shift key and to present a signal to one input terminal of AND gate 117. As soon as the shift key 10 is depressed, the switch contacts 90 and 93 associated with shift key 10 will open and switch contacts 91 and 94 will close. A signal from a source of voltage, not shown, through contacts 91 and 94 of the shift key will be presented by conductor 121 to the other input terminal of the AND gate 117. AND gate 117, now having simultaneous input signals at its two input terminals, will produce an output signal on a conductor 123, which in turn is connected to a conductor 124 back to the pulsed motor 37 to cause the tape reader to advance to the next position. In this next position, the shift key should remain depressed and to accomplish this I have provided a second double acting solenoid 130, which is connected to operate a switch arm 131. The output from AND gate 117, presented on conductor 123, in addition to causing pulse motor 37 to step tape reader 35 to the next position, energizes a coil 134 of the double acting solenoid 130. Energization of coil 134 pulls the normally open switch contact 131 into contact with a terminal 135. In this closed position, a circuit is completed between the switch contact 93 associated with shift key 10 by means of a conductor 138 to the switch arm 131 and from the switch contact 135 by a conductor 140 to the coil 141 of the solenoid operated switch 85. If the student were to release the shift key 10, a signal from the source of voltage, not shown, through contacts 93 of the shift key 10 would cause actuation of the coil 141 associated with the normally closed switch 85, and would open switch 85 to prevent any return path from the coils 70, 74, and 78. If such were the case, none of the coils would operate and all of the keys would be locked. By this means the student is forced to keep the shift key 10 depressed until the subsequent letter or letters are typed, because otherwise, the machine will operate to prevent the actuation of any key.

When it is desired to release the shift key 10, and return to lower case operation, the tape reader 35 will produce an output signal on a conductor 145, which signal is presented to a coil 147 of the double actuated solenoid 130, and from coil 147 by a conductor 148 to one input terminal of AND gate 150. The other input terminal of AND gate 150 is connected to conductor 138 so that when the student releases the shift key 10, the signal on conductor 138, combined with the release signal from the tape reader 35 on conductor 148, provides simultaneous input signals to AND gate 150. When this occurs, an output signal on conductor 153 connected to AND gate 150 will be presented to the solenoid coil 120 associated with the double acting solenoid 112, and from there, back by way of a conductor 156 to the tape reader 35 to complete a circuit for energizing coil 147 of solenoid 130 and coil 120 of solenoid 112. Energization of coil 147 causes the switch arm 131 of the solenoid 130 to open to thereafter prevent the operation of the solenoid switch 85. The signal from AND gate 150 through coil 120 causes member 113 to return to the right to its position for blocking the shift key 10, and prevents further operation thereof until again called for. The signal from coil 120 is also fed by means of conductor 156 and a conductor 160 to the pulse motor 37 to cause the tape reader 35 to step to the next position.

It can thus be seen that the shift key 10 can only be depressed upon a command signal from the tape reader 35, and must remain depressed until a release signal from the tape reader 35 is presented. It is also seen that the student is forced to keep the shift key 10 in the depressed position until a shift release signal occurs, at which time he must release it or no other key can be actuated.

The apparatus show in FIGURE 1 is merely the circuit for the little finger of the left hand. The tape reader 35 actually has as many outputs as there are keys to be depressed, and each output will be connected to an AND gate associated with a separate key. Groups of outputs will be connected to OR gates just as in FIGURE 1, which in turn will lead to the various fingers and to switches attached to those fingers. All of these circuits are the same as those shown in FIGURE 1 and further description of them is believed unnecessary.

FIGURE 2 shows the circuit for the left hand. In FIGURE 2, the tape reader and the coding matrix 35 is shown having 20 output terminals numbered from 180 through 200. Each of these output terminals is representative of a single key to be depressed. For example, terminals 180, 181, 182, and 183 are for the letters z, a, q, and left shift, and correspond to the conductors 40, 41, 42, and 43, of FIGURE 1. These conductors lead to the OR gate shown in FIGURE 2 with reference numeral 203, which would be the same as the OR gate 45 of FIGURE 1. Shown connected to conductors 180, 181, 182, and 183 are conductors 208, 209, 210, and 211 respectively, which would correspond to conductors 46, 50, 54, and 58 of FIGURE 1. The output of OR gate 203 in FIGURE 2 is shown as a conductor 215, which would correspond to conductor 30 of FIGURE 1.

Likewise, in FIGURE 2, the tape reader 35 has outputs 184, 185, 186, and 187 shown connected to an OR gate 220. Conductors 222, 223, 224, and 225 are connected to the conductors 184–187 and would lead to AND gates associated with letters s, x, w, and 2 in a manner similar to that shown in FIGURE 1. The output of OR gate 220 on conductor 230 would lead to a switch similar to that shown in FIGURE 1, but associated with the ring finger rather than the little finger. Conductors 188, 189, 190, and 191 lead to an OR gate 233. Conductors 235, 236, 237, and 238 are connected to conductors 188–191, and would lead to AND gates associated with letters c, d, e, and 3 in a manner similar to that shown in FIGURE 1. The output of the OR gate 233 on conductor 239 would lead to a switch similar to that shown in FIGURE 1, but associated with the middle finger. The conductors 192–199 are shown in FIGURE 2 connected to an OR gate 240. Conductors 242–249 are connected to conductors 192–199 and would lead to AND gates associated with the letters v, f, r, 4, b, g, t, and 5 in a manner similar to that shown in FIGURE 1. The output of OR gate 240 on a conductor 250 would lead to a switch similar to that shown in FIGURE 1 except associated with the index finger. The output on conductor 200 would lead to a switch associated with the thumb and a signal representative of a space would be presented to the thumb switch and would operate in the same manner as that shown in FIGURE 1. Since the space may be operated with either thumb, the switch contacts for the thumbs should be in parallel or common, since either thumb should be allowed to depress the space bar.

Circuits similar to that shown in FIGURE 2 would also exist for the right hand, but it is believed unnecessay to go into a detailed description thereof.

It is thus seen that when the tape reader calls for a particular letter to be typed, only that letter may be typed by the student, and he may type it only with the correct finger. When he has actuated a letter with the correct finger, a signal is sent to advance the tape reader to the next position calling for another letter. By this means, the student is allowed to progress as fast as he pleases, allows him to learn to type at a much more rapid rate, and with much less instructor supervision. He is also prevented from making mistakes which prevent the partial learning of undesirable responses with the result that the student will ultimately emerge a more accurate typist than he would have under normal teaching techniques.

While the specific embodiment shown herein has been directed toward a typewriter teaching machine, it should be understood that other types of apparatus involving the sequential operation of movable members, can equally employ the present invention to advantage. Furthermore, the individual components mentioned with respect to the preferred embodiment should not be construed as limiting, since those skilled in the art may think of many obvious substitutions. For example, the solenoids shown associated with the various keys to prevent their depression need not necessarily be employed in the form shown. The coils for these solenoids could be wound around the actuating lever of each key without the necessity of using a separate blocking bar. Also, the switch shown attached to the finger of the student need not necessarily be attached in the form shown, nor need it be a switch of the variety described. For example, it was within the realm of possibility to use switch contacts painted on with a conductive paint or a differential voltage applied to the respective fingers and whereby the placing of the finger on the metallic surface of the key to be depressed completes the circuit. Since many obvious substitutions can be made by those skilled in the art, I do not wish to be limited by the specific embodiment shown and described herein. I intend to be limited only by the following claims.

I claim as my invention:

1. Apparatus for training a student in the operation of a device which requires the student to actuate a predetermined member of a plurality of actuable members with a predetermined finger comprising:
    a plurality of releasable holding devices one for each of the members and each normally preventing actuation of its corresponding member;
    a switch for mounting on the predetermined finger, and operable to close when the student begins to actuate any member with that finger;
    predetermined releasing means operable to produce a signal to release the holding device corresponding to the predetermined member to be actuated to allow actuation of the member;
    and means connecting said switch between said releasing means and said holding device so that the signal from said releasing means is transmitted to said holding device upon closure of said switch and the student may actuate the predetermined member only when he actuates it with the predetermined finger.

2. Apparatus for use with a device having first and second members to be actuated by third and fourth members respectively comprising:
    first and second releasable holding means normally operable to prevent actuation of the first and second members respectively;
    output means operable to produce a first signal when the first member is to be actuated;
    first and second switch means for mounting on the third and fourth members respectively, said first and second switch means being connected to said output means so that the first switch means receives the first signal and produces a second signal when the third member begins to actuate the first member; and
    means connected to said output means, said first switch means and said first releasable holding means to cause release of said first member upon receipt of the first and second signals simultaneously to allow the first member to be actuated.

3. Apparatus for use with a device having a first member and a second member to be actuated by an operator's first finger and second finger respectively comprising:
    first releasable holding means normally operable to prevent actuation of the first member;
    second releasable holding means normally operable to prevent actuation of the second member;
    output means operable to produce a first electrical signal when the first member is to be actuated and a second electrical signal when the second member is to be actuated;
    first switch means adapted to be connected to the operator's first finger and operable to close when the first finger begins to actuate a member;
    second switch means adapted to be connected to the operator's second finger and operable to close when the second finger begins to actuate a member;
    first gate means having first and second input terminals and operable to produce an output upon the simultaneous occurence of electrical signals in the first and second input terminals thereof;
    second gate means having first and second input terminals and operable to produce an output upon the simultaneous occurrence of electrical signals at the first and second input terminals thereof;
    means connecting said output means to said first gate means to provide the first electrical signal to the first input terminal thereof;
    means connecting said output means to said second gate means to provide the second electrical signal to the first input terminal thereof;
    means connecting said first switch means between said output means and the second input terminal of said first gate means to provide an electrical signal to the second input terminal thereof when the first finger begins to actuate a member;

means connecting said second switch means between said output means and the second output terminal of said second gate means to provide an electrical signal to the second input terminal thereof when the second finger begins to actuate a member; and means connecting said first and second gate means to said first and second holding means respectively, an output from said first gate means causing releases of said first holding means and an output from said second gate means causing releases of said second holding means to allow actuation of the first and second members respectively.

4. Apparatus for training a student in the operation of a device which requires the student to actuate a first member with a first predetermined finger and a second member with a second predetermined finger comprising:

first holding means to normally prevent actuation of the first member;

second holding means to normally prevent actuation of the second member;

first releasing means to be mounted on the first predetermined finger and operable when the student begins to actuate the first member to release said first holding means; and second releasing means to be mounted on the second predetermined finger and operable when the student begins to actuate the second member to release said second holding means so that the student may actuate the first member only with the first predetermined member and the second member only with the second predetermined finger.

5. Apparatus for training a student in the operation of a device which requires the student to actuate the first member with a second member and to actuate a third member with a fourth member comprising:

first holding means normally prevent actuation of the first member;

second holding means to normally prevent actuation of the third member;

first releasing means to be mounted on the second member and operable when the student begins to actuate the first member with the second member to release said first holding means; and second releasing means to be mounted on the fourth member and operable when the student begins to actuate the third member with the fourth member to release said second holding means so that the student may actuate the first member only with the second member and the third member only with the fourth member.

6. Apparatus for use with a device having a plurality of actuable members to be actuated in a predetermined sequence by predetermined fingers of an operator's hands comprising:

a plurality of releasable holding devices each normally operable to prevent actuation of a separate one of the members;

output means having a plurality of output terminals and operable in accordance with the predetermined sequence to produce output signals on separate ones of the output terminals;

a plurality of switches each adapted to be connected to a separate one of the operator's fingers and operable to close when the finger begins to actuate a member;

a plurality of gates having first and second input terminals and each operable to produce an output signal upon the simultaneous occurrence of signals at its first and second input terminals;

means connecting said output means to said gates so that each output terminal is connected to the first input terminal of a separate gate;

means connecting said switches between said output means and said gates so that each switch is connected between at least one of the output terminals and the second input terminal of at least one gate;

and means connecting each gate to a separate one of said holding devices so that an output signal from each gate will cause release of a corresponding holding device to allow actuation of a corresponding member.

7. Apparatus for use with a device having a plurality of members to be actuated in a predetermined sequence by predetermined fingers of an operator's hands comprising:

a tape reader including motive means to drive the tape and including a decoding matrix, said tape reader operable to produce an output signal on one of a plurality of output terminals in accordance with the predetermined sequence as coded on the tape;

a plurality of releasable holding devices each normally operable to prevent actuation of a separate one of the members to be actuated;

a plurality of switches each adapted to be mounted on a separate finger of the operator's hand and each operable to close when the finger begins to actuate a member;

a plurality of AND gates each having first and second input terminals and each operable to produce an output signal upon the simultaneous occurrence of a signal at its first and second input terminals;

means connecting each AND gate to a separate one of said holding devices, an output signal from any AND gate operable to cause release of the corresponding holding device to allow actuation of the corresponding member;

means connecting the first input terminal of each AND gate to a separate one of the output terminals of said tape reader so that the first terminal of one AND gate will receive a signal depending upon the predetermined sequence;

means connecting each switch between selected output terminals of said tape reader and the second input terminal of selected AND gates so that the second terminal of the selected AND gates will receive a signal when a finger begins to actuate a member, only one of said AND gates receiving input signals simultaneously on the first and second input terminals;

and means responsive to the actuation of a member connected to the motive means of said tape reader to drive the tape to the next position and thus change the output signal from the tape reader in accordance with the predetermined sequence.

8. Apparatus for use with a typewriter to train an operator in the use thereof comprising:

a plurality of releasable holding devices, one for each of the keys to be operated and each normally operable to prevent actuation of a separate one of the keys, each of said holding devices having an input and being operable upon receiving a signal at its input to release its corresponding key for actuation;

a plurality of AND gates each having first and second input terminals and an output terminal and each being operable to supply an output signal at its output terminal upon the simultaneous energization of its first and second input terminals;

means connecting the output terminal of each AND gate to the input terminal of a separate one of said holding devices so that an output from each AND gate causes release of a corresponding key for actuation;

a plurality of switches each adapted to mount on a separate one of the student's fingers and each operable to close when its corresponding finger presses a key;

means connecting each of said switches to the first input terminals of separate predetermined groups of said AND gates so that the switch adapted to be connected to each finger is connected to those AND gates corresponding to the keys to be actuated by that finger;

a tape reader including a tape having a plurality of coded signals thereon with each coded signal being representative of a key to be actuated, drive means to advance the tape from one coded position to another in response to an input signal, and a plurality of output terminals with one terminal for each key to be actuated, said tape reader providing an output signal on a separate one of the output terminals for each different coded signal on the tape;

means connecting each of said switches to separate groups of output terminals of said tape reader, the groups of output terminals being chosen so that each signal on an output terminal of said tape reader representative of a key to be actuated is presented to that switch which is adapted to mount on the finger which is to actuate the key;

means connecting each output terminal of said tape reader to a second input terminal of a separate AND gate so that each signal on an output terminal of said tape reader representative of a key to be actuated energizes the second input terminal of that AND gate corresponding to the key to be actuated;

and means connected to said tape reader to provide an input signal to the drive means upon actuation of a key.

References Cited by the Examiner
UNITED STATES PATENTS

| | | | |
|---|---|---|---|
| 2,312,138 | 2/1943 | Watson | 35—5 |
| 3,021,937 | 2/1962 | Seymour | 197—107 |
| 3,112,569 | 12/1963 | Moore et al. | 35—5 |
| 3,128,563 | 4/1964 | Kobler | 35—6 |
| 3,136,072 | 6/1964 | Ross | 35—5 |
| 3,166,856 | 1/1965 | Uttal | 35—6 |

EUGENE R. CAPOZIO, *Primary Examiner.*

LAWRENCE CHARLES, *Examiner.*